US008950482B2

(12) United States Patent
Hill et al.

(10) Patent No.: US 8,950,482 B2
(45) Date of Patent: Feb. 10, 2015

(54) FRACTURE MONITORING

(75) Inventors: David John Hill, Dorset (GB); Magnus McEwen-King, Hampshire (GB); Patrick Tindell, Dorset (GB)

(73) Assignee: Optasense Holdings Ltd. (GB)

( * ) Notice: Subject to any disclaimer, the term of this patent is extended or adjusted under 35 U.S.C. 154(b) by 425 days.

(21) Appl. No.: 13/320,882

(22) PCT Filed: May 27, 2010

(86) PCT No.: PCT/GB2010/001051
§ 371 (c)(1),
(2), (4) Date: Nov. 16, 2011

(87) PCT Pub. No.: WO2010/136764
PCT Pub. Date: Dec. 2, 2010

(65) Prior Publication Data
US 2012/0111560 A1 May 10, 2012

(30) Foreign Application Priority Data

May 27, 2009 (GB) .................................. 0909038.2
Nov. 13, 2009 (GB) .................................. 0919915.9

(51) Int. Cl.
*E21B 43/26* (2006.01)
*E21B 47/00* (2012.01)
(Continued)

(52) U.S. Cl.
CPC ......... *E21B 47/101* (2013.01); *E21B 43/11857* (2013.01); *E21B 43/26* (2013.01);
(Continued)

(58) Field of Classification Search
USPC ................. 166/250.1, 308.1, 177.5
See application file for complete search history.

(56) References Cited

U.S. PATENT DOCUMENTS 6,268,911 B1 7/2001 Tubel et al.
7,946,341 B2 * 5/2011 Hartog et al. .............. 166/254.1
(Continued)

FOREIGN PATENT DOCUMENTS

EP 1400818 3/2004
GB 2398805 7/2006
(Continued)

OTHER PUBLICATIONS

Stewart, "Acoustic Emission Monitoring During Hydraulic Fracturing", SPE Formulation Evaluation (Paper 20970), Jun. 1992, pp. 139-144, XP002651924.
(Continued)

*Primary Examiner* — William P Neuder
(74) *Attorney, Agent, or Firm* — McDonnell Boehnen Hulbert & Berghoff LLP

(57) ABSTRACT

This application relates to methods and apparatus for monitoring hydraulic fracturing during oil/gas well formation. A fiber optic cable (102) deployed down a well bore (106), which may be the well bore in which fracturing is performed, is interrogated to provide a distributed acoustic sensor. Data is sampled from at least one longitudinal sensing portion of the fiber and processed to provide at least fracturing characteristic. The fracturing characteristic may comprise the characteristics of high frequency transients indicative of fracturing events (606). The intensity, frequency, duration and signal evolution of the transients may be monitored to provide the fracturing characteristic. Additionally or alternatively the fracturing characteristic may comprise the longer term acoustic noise generated by fracture fluid flow to the fracture sites. The intensity and frequency of the noise may be analyzed to determine the fracturing characteristic. The method allows real-time control of the fracturing process.

65 Claims, 5 Drawing Sheets

(51) Int. Cl.
    *E21B 47/10*     (2012.01)
    *E21B 43/1185*     (2006.01)
    *E21B 47/12*     (2012.01)
    *G01V 1/50*     (2006.01)
    *G01H 9/00*     (2006.01)

(52) U.S. Cl.
    CPC .............. E21B 47/123 (2013.01); G01V 1/50 (2013.01); *G01H 9/004* (2013.01); *G01V 2210/646* (2013.01); *G01V 2210/1429* (2013.01)
    USPC ................... 166/250.1; 166/308.1; 166/177.5

(56) References Cited

U.S. PATENT DOCUMENTS

| | | |
|---|---|---|
| 2004/0104029 A1 | 6/2004 | Martin |
| 2006/0028637 A1 | 2/2006 | Payton |
| 2009/0003133 A1 | 1/2009 | Dalton et al. |
| 2009/0114386 A1 | 5/2009 | Hartog et al. |
| 2013/0233537 A1* | 9/2013 | McEwen-King et al. . 166/250.1 |

FOREIGN PATENT DOCUMENTS

| | | |
|---|---|---|
| GB | 2442745 | 4/2008 |
| WO | WO2005/033465 | 4/2005 |
| WO | WO2008/098380 | 8/2008 |
| WO | WO2009/056855 | 5/2009 |
| WO | WO2010/020795 | 2/2010 |
| WO | WO2010/116119 | 10/2010 |
| WO | WO2011/058313 | 5/2011 |
| WO | WO2011/058314 | 5/2011 |

OTHER PUBLICATIONS

Unpublished U.S. Appl. No. 13/320,877, filed Nov. 16, 2011 entitled: Well Monitoring by Means of Distributed Sensing Means.
Preliminary Amendment filed on Nov. 16, 2011 in U.S. Appl. No. 13/320,877.
Unpublished U.S. Appl. No. 13/320,884, filed Nov. 16, 2011 entitled: Well Monitoring by Means of Distributed Sensing Means.
Preliminary Amendment filed on Nov. 16, 2011 in U.S. Appl. No. 13/320,884.

* cited by examiner

FRACTURE MONITORING

FIELD OF THE INVENTION

The present invention relates to monitoring of fracturing during the formation of production wells such as oil and gas wells. Monitoring of the steps used in formation of such wells and monitoring of such wells in use is often referred to as downhole monitoring. In particular, the present invention relates to downhole monitoring using distributed acoustic sensing (DAS).

BACKGROUND OF THE INVENTION

Fibre optic sensors are becoming a well-established technology for a range of applications, for example geophysical applications. Fibre optic sensors can take a variety of forms, and a commonly adopted form is to arrange a coil of fibre around a mandrel. Point sensors such as geophones or hydrophones can be made in this way, to detect acoustic and seismic data at a point, and large arrays of such point sensors can be multiplexed together using fibre optic connecting cables, to form an all fibre optic system. Passive multiplexing can be achieved entirely optically, and a an advantage is that no electrical connections are required, which has great benefit in harsh environments where electrical equipment is easily damaged.

Fibre optic sensors have found application in downhole monitoring, and it is known to provide an array of geophones in or around a well to detect seismic signals with the aim of better understanding the local geological conditions and extraction process. A problem with such an approach is that geophones tend to be relatively large and so installation downhole is difficult. In addition geophones tend to have limited dynamic range.

WO 2005/033465 describes a system of downhole acoustic monitoring using a fibre having a number of periodic refractive index perturbations, for example Bragg gratings. Acoustic data is retrieved by portions of the fibre and used to monitor downhole conditions during operation.

Fracturing is an important process during the formation of some oil or gas wells, referred to as unconventional wells, to stimulate the flow of oil or gas from a rock formation. Typically a borehole is drilled to the rock formation and lined with a casing. The outside of the casing may be filled with cement so as to prevent contamination of aquifers etc. when flow starts. In unconventional wells the rock formation may require fracturing in order to stimulate the flow. Typically this is achieved by a two-stage process of perforation followed by hydraulic fracturing. Perforation involve firing a series of perforation charges, i.e. shaped charges, from within the casing that create perforations through the casing and cement that extend into the rock formation. Once perforation is complete the rock is fractured by pumping a fluid, such as water, down the well under high pressure. This fluid is therefore forced into the perforations and, when sufficient pressure is reached, causes fracturing of the rock. A solid particulate, such as sand, is typically added to the fluid to lodge in the fractures that are formed and keep them open. Such a solid particulate is referred to as proppant. The well may be perforated in a series of sections, starting with the furthest section of well from the well head. Thus when a section of well has been perforated it may be blocked off by a blanking plug whilst the next section of well is perforated and fractured.

The fracturing process is a key step in unconventional well formation and it is the fracturing process that effectively determines the efficiency of the well. However control and monitoring of the fracture process is very difficult. The amount of fluid and proppant and flow rate are generally measured to help determine when sufficient fracturing may have occurred and also to identify potential problems in the fracturing process.

One possible problem, known as proppant wash-out, occurs when the cement surrounding the casing has failed and the fluid is simply flowing into a void. This wastes proppant fluid and prevents effective fracturing. A high flow rate or sudden increase in flow rate may be indicative of proppant wash-out.

Another problem relates to a situation that can develop where most of the fluid and proppant flows to the rock formation via one or more perforations, preventing effective fracturing via other perforation sites. Typically a fracturing process is performed for a segment of the well and, as mentioned above, several perforations may be made along the length of that well section such that the subsequent hydraulic fracturing process causes fracturing at a number of different locations along that section of well. During the hydraulic fracturing process however it is possible that the rock at one or more perforation sites may fracture more readily than at the remaining perforations. In this case one or more of the developing fractures may start to take the majority of the fluid and proppant, reducing the pressure at the other perforation sites. This can result in reduced fracturing at the other perforation sites. Increasing the flow rate of fluid and proppant may simply lead to increased fracturing at the first peroration site which may simply enlarge the fracture and not have a significant impact on how much oil or gas is received via that fracture. However reduced fracturing at the other sites can reduce the amount of oil and gas received via those sites, thus negatively impacting on the efficiency of the well as a whole. For example suppose that a section of well is perforated at four different locations for subsequent fracturing. If during the fracturing process three of the perforation sites fracture relatively readily then more of the fluid and proppant will flow to these sites. This may prevent the fourth fracture site from ever developing sufficient pressure to effectively fracture with the result that only three fractures extend into the rock formation to provide a path for flow. Thus the efficiency of this section of the well is only 75% of what would ideally be expected.

If such a situation is suspected additional, larger solid material can be added to the fluid, typically balls of solid material of a particular size or range of sizes. The size of the balls is such that they can flow into relatively large fractures where they will be embedded to cause an obstruction but are large enough not to interfere with relatively small fractures. In this way relatively large fractures, which may be consuming most of the fracture fluid, are partially blocked during the hydraulic fracture process, with the result that the flow to all fractures is evened out.

Conventionally the flow conditions of the fracture fluid is monitored to try to determine if one or more fracture sites are becoming dominant and thus preventing effective fracturing at one or more other fracture sites but this is difficult to do and often relies on the experience of the well engineers.

As well as the problems noted above merely controlling the fracture process to ensure that a desired extent of fracturing has occurred is difficult. Further, there may be more than one oil well provided to extract the oil or gas from the rock formation. When creating a new well the fractures should not extend into an area of the rock formation which is already supplying an existing well as any flow at the new well from such area may simply reduce the flow at the existing well. Determining the direction and extent of the fractures is very difficult however.

In addition to monitoring the flow rate of the fluid, sensor readings may be acquired during the fracturing process from sensors located in a separate observation well and/or at ground level. These sensors may include geophones or other seismic sensors deployed to record seismic event during the fracture process. These sensor readings can then be analysed after the fracturing process in order to try to determine the general location and extent of fracturing but offer little use for real time control of the fracturing process.

SUMMARY OF THE INVENTION

It is an object of the present invention to provide improved systems and methods for monitoring of downhole fracturing.

According to a first aspect of the invention there is provided a method for downhole monitoring of hydraulic fracturing comprising the steps of: interrogating a optic fibre arranged down the path of a well bore to provide a distributed acoustic sensor, sampling data from a plurality of longitudinal portions of the fibre; and processing said data to provide an indication of at least one fracturing characteristic.

Distributed acoustic sensing (DAS) offers an alternative form of fibre optic sensing to point sensors, whereby a single length of longitudinal fibre is optically interrogated, usually by one or more input pulses, to provide substantially continuous sensing of vibrational activity along its length. Optical pulses are launched into the fibre and the radiation backscattered from within the fibre is detected and analysed. Rayleigh backscattering is most usually detected. By analysing the radiation backscattered within the fibre, the fibre can effectively be divided into a plurality of discrete sensing portions which may be (but do not have to be) contiguous. Within each discrete sensing portion mechanical vibrations of the fibre, for instance from acoustic sources, cause a variation in the amount of radiation which is backscattered from that portion. This variation can be detected and analysed and used to give a measure of the intensity of disturbance of the fibre at that sensing portion. As used in this specification the term "distributed acoustic sensor" will be taken to mean a sensor comprising an optic fibre which is interrogated optically to provide a plurality of discrete acoustic sensing portions distributed longitudinally along the fibre and acoustic shall be taken to mean any type of mechanical vibration or pressure wave, including seismic waves. The method may therefore comprise launching a series of optical pulses into said fibre and detecting radiation Rayleigh backscattered by the fibre; and processing the detected Rayleigh backscattered radiation to provide a plurality of discrete longitudinal sensing portions of the fibre. Note that as used herein the term optical is not restricted to the visible spectrum and optical radiation includes infrared radiation and ultraviolet radiation.

The single length of fibre is typically single mode fibre, and is preferably free of any mirrors, reflectors, gratings, or (absent any external stimulus) any change of optical properties along its length, i.e. absent any designed optical variation along its length. This provides the advantage that an unmodified, substantially continuous length of standard fibre can be used, requiring little or no modification or preparation for use. A suitable DAS system is described in GB2442745 for example, the content of which is hereby incorporated by reference. Such a sensor may be seen as a fully distributed or intrinsic sensor as it uses the intrinsic scattering processed inherent in an optical fibre and thus distributes the sensing function throughout the whole of the optical fibre.

Since the fibre has no discontinuities, the length and arrangement of fibre sections corresponding to each channel is determined by the interrogation of the fibre. These can be selected according to the physical arrangement of the fibre and the well it is monitoring, and also according to the type of monitoring required. In this way, the distance along the fibre, or depth in the case of a substantially vertical well, and the length of each fibre section, or channel resolution, can easily be varied with adjustments to the interrogator changing the input pulse width and input pulse duty cycle, without any changes to the fibre. Distributed acoustic sensing can operate with a longitudinal fibre of 40 km or more in length, for example resolving sensed data into 10 m lengths. In a typical downhole application a fibre length of a few kilometers is usual, i.e. a fibre runs along the length of the entire borehole and the channel resolution of the longitudinal sensing portions of fibre may be of the order or 1 m or a few meters. As mentioned below the spatial resolution, i.e. the length of the individual sensing portions of fibre, and the distribution of the channels may be varied during use, for example in response to the detected signals.

In the method of the present invention the returns from the fibre are processed to provide an indication of at least one fracturing characteristic. In a DAS sensor such as described in GB2442745, the processing from each separate acoustic channel can be done in real time. Thus the method of the present invention provides an indication of fracture characteristics in real-time, i.e. without any significant delay. The indication of fracture characteristics provided by the current method can therefore be used in controlling the fracture process. The method of the present invention is performed during the time that fluid and proppant is being forced down the well bore and provides a real time indication of what is happening down the well. This can allow the operator to adjust flow parameters, stop the flow or add additional solid material as necessary based on the indication of fracturing characteristic, i.e. the data from the DAS sensor. In some embodiments an automatic controller may be adapted to adjust the flow parameters automatically based on the fracturing characteristic.

The skilled person will appreciate that there will inherently be some small delay involved in receiving the radiation backscattered from the relevant section of fibre as the radiation must travel back from the relevant part of the fibre where scattering occurs to the detector at the end of the fibre. Further there will be some small delays associated with operation of the detector, sampling of the data and processing of the data so as to provide an indication of the fracturing characteristics. However DAS sensing according to the present invention can provide an indication of the acoustic disturbances detected by sensing portions of the fibre without any significant delay, i.e. within a few seconds, or one second, or within 500 ms, 100 ms, 10 ms or less from the actual disturbance. This can be achieved by using commercially available detectors and processors.

The indication of fracture characteristics may comprise an audio playback of the acoustic signals from one or more selected sensing portions of the fibre located in the vicinity of the fracture sites.

The optic fibre is preferably located within the well bore in which fracturing is being performed. In one arrangement the optic fibre runs along the exterior of the well casing, although the fibre could, in some embodiments, be arranged to run within the casing. The optic fibre may be attached to the well casing as it is inserted into the well bore and, if on the exterior of the casing, subsequently cemented in place in those sections of the well which are cemented.

The fibre therefore follows the general route of the well bore and extends at least as far into the well bore as the region in which fracturing is to occur. When fracturing any given section of the well bore, the fibre can therefore be interrogated to provide one, or preferably a plurality, of acoustic sensing portions in the vicinity of the fracturing site, i.e. the location along the well bore at which fracture fluid is flowing, or is expected to flow, into the rock formation to cause fracturing. The position or location of the sensing portions of interest should generally be known from a knowledge of the length along the fibre, and hence the well. However, when perforation is performed the method may comprise monitoring the acoustic disturbances in the fibre generated by the perforation step. The acoustic disturbances during perforation may be used to determine the portions of the fibre that correspond to fracture sites. For instance, portions of the fibre which exhibit the greatest acoustic disturbance intensity during perforation will generally correspond to the location where the perforation charges fired and hence to the fracture sites.

The acoustic signals from one or more relevant section of fibre where fracturing is expected may therefore be played on a suitable audio device. This will provide the personnel controlling the fracture process with audible feedback of what is happening at the fracture site. The flow of fluid and proppant will create a background noise signal and fractures will be relatively high intensity transient signals which will sound like cracks to the operators. An operator listening to the signals produced by an acoustic channel of the fibre next to an individual perforation site will therefore be provided with real-time audio feedback of the flow of proppant fluid and any resultant fracturing occurring at that fracture site.

It will be appreciated that the conditions down a deep well bore can be hostile and especially so during hydraulic fracturing. Therefore placement of a specific sensor down the well bore during fracturing has not hitherto been practical. The method of the present invention uses a fibre optic which may to be located on the exterior of the well casing to provide a downhole sensor in the well bore being fractured.

The indication may also comprise a comparison of the intensity levels of acoustic disturbances in the vicinity of each of a number of different fracture sites. The average intensity or acoustic energy in each relevant sensing portion of fibre can be used to indicate if one fracture site is performing significantly differently to another fracture site, e.g. whether one fracture site is associated with a significantly lower or higher acoustic energy than another fracture site. This can be used to indicate if a particular fracture site or sites are more or less active than other fracture sites.

If an acoustic channel of the fibre in the vicinity of one fracture site is showing a significantly higher acoustic energy than the other fracture sites this could be a sign that a greater proportion of the proppant fluid is flowing into the rock formation at this point. Similarly if one fracture site is showing a relatively low acoustic intensity this could be an indication that there is no significant flow of proppant fluid into the rock formation. Thus the relative acoustic intensities could be used to indicate that one or more fracture sites is consuming more of the proppant fluid and/or one or more of the fracture sites are relatively inactive.

This information may be used by the personnel controlling the fracture process to modify the proppant flow conditions. For instance the flow rate may be varied or solid material such as balls of a particular size could be added to the flow to partial block a dominant fracture site as discussed above. The method of the present invention provides a reliable method for determining when one or more fracture sites are consuming most of the proppant, allowing the operator of the process to make any necessary changes. Further the method provides real time feedback as to whether changes made by an operator are effective, for instance in improving fracturing or evening out fracturing between several fracturing sites. As described above balls of solid material may be added to the fracturing fluid in order to partially block a dominant fracture site. Choosing the correct size or range of sizes of material is important to ensure that the dominant fracture is partially blocked whereas the other fractures are not significantly impeded. Choice of size of material to add and amount of material to add can be largely guesswork. Using the method of the present invention however additional solid material can be added in stages, with different sizes being added in different stages, and the effects on the acoustic intensity at each of the fracture sites monitored in real time.

The acoustic information may be displayed as a real time graph of acoustic energy, i.e. intensity, for each of the separate acoustic channels being monitored. This provides an operator with a visual indication of the relevant activity for each fracture site. Other means of visibly displaying the data may also be employed.

The method may involve dividing the data from the longitudinal sensing portions of the fibre into one or more spectral bands. In other words the data may be filtered so as to include only acoustic disturbances with a frequency within the frequency range of the particular spectral band. Analysing the data by spectral band can more clearly indicate the acoustic difference between various channels at the fracture sites. As the proppant fluid flow is a high pressure flow of a fluid containing a particulate it is inherently a noisy process and there will be a variety of acoustic responses due to the flow within the casing. Flow into a perforation may be associated with a particular frequency characteristic and thus the difference between the flows may more readily discernible at a particular spectral band or bands.

As mentioned above the hydraulic fracturing step is inherently a very noisy process. Thus the use of an acoustic sensor, within the well bore in which fracturing is occurring, to provide meaningful information regarding the fracturing occurring is surprising and the use of a distributed acoustic sensor downhole in a well bore in which hydraulic fracturing is being performed to provide useful information about the fracturing process, i.e. information that can be used to sensibly modify the process, represents another aspect of the invention.

In some cases the spectral band of most interest may be known in advance. In other cases however the well dynamics and dynamics of the fracturing process may all influence the spectral response. Therefore in some embodiments the method may comprise dividing the acoustic disturbances from the relevant sensing portions of the fibre into a plurality of spectral bands which can each be displayed to the operators. The different spectral bands could be displayed simultaneously or sequentially to an operator or the operator could select which of the spectral bands could be displayed.

The spectral bands may be processed to automatically detect a spectral band of interest. For instance the data for each spectral band may be processed to detect the presence of significant local maxima of average energy which could be indicative of the acoustic signal from the proppant and fluid flowing into the perforation site. The processing could be constrained based on knowledge of the acoustic channels that correspond to the perforation sites, for instance as predetermined based on knowledge of the fibre, as selected by an operator or as determined by measurement during firing of the perforation charges. In other words the spectral bands could be analysed to determine a spectral band in which the energy in the channels corresponding to the perforation sites are significantly higher than the energy of other nearby channels. The spectral bands could also be analysed to detect any spectral band in which the acoustic energy at one or more channels corresponding to a perforation site is significantly lower than the acoustic energy at one or more other perforation sites. The relevant spectral bands could be displayed or highlighted to an operator.

The method may also comprise monitoring the relative acoustic energy of the channels corresponding to the perforation sites over time, for instance to determine if the instantaneous average in any relevant channel is changing significantly and/or if the relative energies in the channels corresponding to the perforation sites varies. If the acoustic energy levels change significantly, for example in the average intensity of a particular channel corresponding to a perforation site undergoes a sudden jump or if the relative intensities of two channels corresponding to different perforation sites diverges beyond a certain threshold, the process may generate an alert for an operator, for instance a visible and/or audible alarm.

In some embodiments the frequency and/or intensity signals from the channels which are located at the perforation sites may be analysed to determine characteristics of the fracture. As mentioned above the mechanical disturbances experienced by the acoustic channels due to flow of the fracture fluid into the rock formation via the perforation site may comprise frequency component that may be dependent on the relative size of the perforation and current fracture size. Thus by analysing the frequency or frequencies at which the acoustic signals due predominantly to flow of fluid into the fracture the relative size of the fracture may be inferred.

Historical data from prior fracturing processes may be collected and analysed in order to aid in estimating fracture properties. For instance, as describe above the method of the present invention can determine the effect that addition of solid material of a particular size has on the flow of fracture fluid to a plurality of different fractures. Therefore the method may comprise recording the data from at least the acoustic channel or channels in the vicinity of the fracture sites for later analysis. Whilst the real-time feedback to the operator is useful, further analysis can be performed to improve the feedback available in future fracturing processes. The present invention also relates to the analysis of the historical data to identify fracture characteristics.

For instance, examining the acoustic responses to see how the signals changed when solid material of a particular size was added allows determination of some general dimensions of a fracture. If balls of diameter D1 being added to the fluid does not significantly effect the acoustic response of a particular fracture, whereas balls of a smaller diameter D2 do appear to affect the flow into that fracture, it may be inferred that the relevant fracture has a general dimension somewhere between D1 and D2 (possibly adjusted to take into account compressibility of the material of the balls). The acoustic responses of fractures of certain size ranges may therefore be analysed. For instance an acoustic channel which is located at a fracture which responds to balls of size D2 but not size D1 may exhibit a string spectral component in a first range but may simply show background noise in a second spectral range. An acoustic channel which is located at a different fracture site, which exhibits no significant change in signal when balls of size D1 or D2 are added (and thus may be assumed to be smaller in some dimension) may exhibit no significant components in the first spectral range but may exhibit a significant component in the second spectral range. If this data is determined for a particular rock formation say then it may be applied to a new fracturing process conducted in the same rock formation. For example, real time analysis of the spectral response of the acoustic channels during a fracturing process may be used to infer a size of the fracture. The indication presented to an operator could include an indication of the size of fractures—which could for instance be useful in controlling flow parameters and, if necessary, in choosing an appropriate size of solid material to be added to the fluid.

The indication of at least one fracture characteristic may comprise an indication of transients, especially relatively high frequency transients, in the acoustic signal. Fracture events of interest are of a distinctly different nature from the continuous flow noise caused by the high pressure influx of water and sand during the fracturing process. Generally they are characterised by being short and impulsive events—hereafter referred to as transient events. The method may comprise detecting such transients in order to characterize the fracturing. For instance the method may comprise implementing a technique looking at short term variations away from the mean variable levels (the transient detector) to extract these events from background and long period noise. The method may also use the characteristics of known fracture events to identify the fracture events. The characteristics of the known fracturing events may take into account the type of rock formation being fractured, i.e. the method may look for acoustic 'signatures' associated with fracturing that generally occur and these signatures may vary according to the type of rock formation.

The method may comprise indicating the number of transients that have been detected and/or the rate of transient occurrence. As the transients are indicative of fracturing, and the process is intended to fracture the rock to provide flow paths, a higher number of transients may be indicative that the fracturing process is going well. The number and/or rate of transients therefore provide the indication of the fracturing characteristic. The number/rate of transients may be relayed to the operator of the fracturing process and may used to determine whether to adjust the parameters of the fracturing process. This may take into account the type of rock formation being fractured. Some rock formations may fracture relatively easily and so a relatively high number of relatively low intensity fracturing events, i.e. transients, may be expected at a relatively high rate. Other rock formations may fracture less readily and thus may result in comparatively fewer and less frequent, but more intense, fracture events and hence transients. As the type of rock formation will have been assessed prior to well formation, the number and/or rate of transients detected can be compared to an expected number/rate.

The intensity of the transient signals may also be detected. The intensity of the acoustic transient may be related to the energy of the fracture event. The intensity may also be related to the extent of the resulting fracture, i.e. how long the resulting fracture is. Knowing how far the fracture propagates can be important information.

The method may also comprise identifying a series of related transients, which may for instance be indicative of a relatively high magnitude fracturing event. The duration of a transient and/or a series of transients may also provide an indication of the magnitude of the event.

Clearly the seismic waves generated by a fracture event are attenuated as they pass through the rock and so signals received at the fibre from fracture events that are further away will be more attenuated. Thus the method may involve determining a general location or at least range to the fracture event so the degree of attenuation may be taken into account. For instance the time of arrival of a particular transient event at different sensing portions of the fibre may be used to estimate a path length difference from the origin of the transient to the various section of fibre. This can be used to estimate a range to the origin of the fracture event using multi-lateration type techniques. Other techniques for locating the origin of the fracture event will be described in more detail below.

The evolution of the transient signal may be analysed, i.e. the duration, rise time and fall time of the transient in order to determine the type of fracture event. Different types of fracture may have different characteristics. For instance some fractures may comprise a shattering type event whereas others may comprise a splitting of strata of rock. The energy content and/or signal evolution may be different for different types of fracture.

The frequency characteristics of the detected transients may also be analysed, for instance to determine general frequency of the transient, i.e. the frequency of maximum intensity. The spread of frequencies in the transient signal may also be analysed. For instance a transient wherein the energy is concentrated in one or more narrow ranges of frequencies may indicate a different type of fracturing event to a transient wherein the energy if spread across a relatively wide range of frequencies. The method may also comprise analysing the relative intensity in different frequency bands, i.e. the frequency spread of the acoustic energy.

As mentioned the general frequency or dominant frequencies of the transient may provide an indication of the energy and/or type of fracture. Higher energy fractures in some rock types might lead to high frequency transients. Fractures that result in a single fracture may have one or more frequency spikes at defined frequencies whereas shatter type fracture may have a greater frequency spread. Thus the frequency characteristics of the transients may provide the fracturing characteristic.

Again it will be noted that the distance of the fracture from the fibre may influence the frequency component of the detected transient as different frequencies are attenuated by different amounts. Thus an indication of the location of the fracture event may be taken into account, for instance by weighting the transient event with frequency dependent weightings based on their estimated distance from the fibre.

The method may therefore comprise displaying to an operator data regarding the number, rate, intensity, signal evolution, frequency and/or frequency spread of transient events, as an indication of fracturing characteristic. The method may involve providing a resultant indication of the number and/or rate of fractures, the size or intensity of the fracture event, an indication of the type of fracture event and/or, as will be described below, an indication of the fracture density and/or a fracture map.

This information may be used to control the fracturing process. The flow parameters may be changed if the detected transients are not occurring at a desired rate or with a desired intensity or if the transient characteristics do not match a preferred fracturing type. As the information can be provided in real time the process parameters can be adjusted in a feedback loop to determine whether or not changing the flow parameters improves the fracturing process. For instance the flow rate may be changed to determine if there is a consequent change in fracturing rate or the type of fracturing occurring.

As mentioned the method may comprise analysing the transients for one or more specific characteristics of known fracture types or indicative of preferred fracturing characteristics. Data collected during the fracturing process, as well as providing useful real-time feedback, may also be retained for further analysis. This data may also be analysed with other data collected during other fracturing processes to detect any commonality during the fracturing process. The data stored may include not only the acoustic data but also data regarding the rock type, flow conditions etc. The data collected may also be correlated with subsequent production in order to identify characteristics of the transients which may be associated with good production.

It should be noted that the DAS sensor employed downhole may, after fracturing, also be employed as an in-flow monitoring system during actual production from the well. In this way the flow of oil/gas into the well may be monitored and the relative flow from each different fracturing site may be assessed. Measuring the overall flow at the top of the well is indicative of the overall fracturing process for the whole well. By using the DAS sensor however the relative contribution from each fracturing site or collection of sites may be assessed.

It may therefore be possible to correlate particular types of transients, in particular rock formations, with good resulting production characteristics. Thus a preferred type of transient for a particular rock formation, and the characteristics associated with that transient may be identified.

In this way the detection of transient characteristics during a fracturing process may be used to indicate how effective the fracturing is. This information may be useful in controlling the fracturing process. For instance if the transients characteristics match those that, for the particular rock formation, typically lead to good production it may be that the fracturing process need not be continued for as long as if the transient characteristics are indicative of less good subsequent production.

Many oil/gas wells are located in remote locations. Transporting the amount of proppant required for fracturing is a significant cost. If the amount of proppant required can be significantly reduced, with no loss in production of the resulting well, this could represent a significant saving. The method of the present invention may be employed to monitor the fracture process and, by providing the operator with the transient characteristics, may allow an operator to determine when best to terminate the process—thus reducing waste of proppant.

Further the operator may be able to adjust the flow parameters to alter the characteristics of the transients (and hence the fractures) to better resemble characteristics that typically lead to good production in that type of rock formation. In other words the operator may adjust the flow properties and determine the effect on the transient characteristics in order to produce transients having the desired characteristics. In this way the process may be controlled to improve the resultant production.

As mentioned above the method may also comprise determining the direction of the origin of the transient, i.e. the direction to the location of the fracture event that generated the transient. The method may also comprise determining a range to the origin of the transient.

The direction to the location of the fracture event may be determined by comparing the time of arrival of the seismic disturbance at various different locations, for example by applying multi-lateration techniques. The range to the fracture event may also be determined by measuring the time of arrival of the transient signal at different sections of the fibre and a value of the speed of propagation of seismic waves through the rock formation—which could be measured or estimated. Depending on the path of the well bore the different locations could be different locations along the well bore. However if the well bore is generally straight, such as vertical well, or generally lies in a single plane, such as having a vertical shaft from the surface and a straight horizontal underground section, using data from the downhole DAS alone may result in some positional ambiguity.

The method may therefore comprise using data from at least one other sensor at another location. The at least one additional sensor may comprise another fibre optic distributed acoustic sensor, for instance a DAS sensor which is placed in an already existing well in the surrounding area and/or a DAS sensor in an observation bore hole drilled nearby and/or a DAS sensor arranged at or near the surface of the general area, such as buried in a trench. The combination of data from many different sensors in different locations may allow the point of origin, or at least general area of origin, of the fracture event to be determined. This can be used to determine the extent of the fracture and to control the fracture process.

For instance, consider the situation where an existing vertical well exists and is assumed to have fractures extending radially away from the well bore for a distance F (for instance as determined by post-processing of seismic data from an observation bore hole). A new well vertical well is drilled at a distance D away from the first well, with D being slightly greater than 2 F. The new well bore, which includes a first fibre optic for DAS, is then perforated horizontally and hydraulic fracturing performed. If the existing well also comprises a fibre optic suitable for DAS, a second DAS sensor, the hydraulic fracturing can be performed and the flow parameters adjusted based on the signals from the first DAS in the manner described above. In addition however the results from both the first and second DAS sensors may be analysed to detect transients which may be fracture events and to detect the same transient in the returns from both fibres, for instance for looking for acoustic disturbances at the same frequency and with the same general intensity profile. If any such signals are identified the time of arrival at each fibre can be determined. Initially, as the fracture events will be much closer to the new well, the time of arrival at the first DAS will be before the time of arrival at the second DAS. As the fracture process continues however, for any fracturing that occurs in the general direction of the existing well the difference in time of arrival at the two DAS sensors will decrease. Once a signal is detected which arrives at the first DAS at almost the same time as it does at the second DAS this can be taken to mean that the fracture event is nearly as close to the existing well as it is to the new well. At this point the fracturing process may be stopped to prevent the new fractures from extending into the area of the existing well.

The example above is a very simple example and it will be apparent that the fracture event may not have occurred on the direct line joining the two wells. A further sensor in an observation bore hole offset from line joining the two wells would allow better discrimination of the actual position. However it will be noted that one of the DAS sensors may be provided in the well bore in which the fracture process is being performed and that another DAS sensor may be provided in an existing well. The fibre optic for this DAS sensor may have been embedded exterior to the well casing when the existing well was formed. It will therefore be apparent that the DAS sensor may already be in place and does not need a special observation bore hole to be drilled. Further the DAS sensor of the existing well can be used without needing to halt production of the first well. A method of using DAS sensors in multiple well bores for fracture mapping represents another aspect of the present invention. Thus in another aspect there is provided a method of fracture mapping during a hydraulic fracturing process comprising the step of receiving data from a plurality of fibre optic distributed acoustic sensors in a plurality of well bores during a hydraulic fracture and processing said data to detect acoustic disturbances arising from a fracture event arriving at each of said distributed acoustic sensors and using the time of arrival at each of said distributed acoustic sensors to determine the location of the origin of said fracture event.

Referring back to the method of monitoring the fracturing process, the indication of at least one fracture characteristic may also comprise an indication of proppant wash out. As mentioned above proppant wash out can occur where the fracture fluid finds a flow path other than to the relevant fracture sites, for instance into a void within the rock formation or caused by failure of the cement casing. As has been described above, in a normal fracturing process the fluid flows into the rock formation via the perforation sites via the fractures so caused. Upstream of the fracturing sites the flow of fluid and proppant will create acoustic disturbances but the characteristics of the disturbances will be different. If part of the casing fails upstream of the perforation sites this will produce a significant acoustic signal at the location of failure—due to the flow into the rock formation at this point. Also the reduced pressure downstream of the failure point will also be detectable. Thus the method may comprise analysing signals returns from sensing portions of the fibre along the length of the well bore to detect any significant signals indicative of wash-out. If such a signal is detected the operator may be alerted and/in some embodiments further flow may be automatically stopped.

As well as detecting proppant washout during the fracturing process the method may comprise the step of identifying any potential points of failure of the casing and/or surrounding cement prior to the hydraulic fracturing step. As mentioned above the DAS sensor may be operated during firing of the perforation charges. Firing of the perforation charges will create a relatively intense series of acoustic pulses that will effectively acoustically excite the well bore. As mentioned above the optic fibre may be embedded in the cement surrounding the casing. The vibrations transmitted to the optic fibre will therefore partly depend on the nature of the casing and surrounding cement. In place where the cement and casing are solid the sensing portions of the fibre may experience a first type of response. However in any areas where the casing and/or surrounding cement has failed the acoustic response will vary. Thus the method may comprise obtained an acoustic profile of the well bore prior to hydraulic fracturing and analysing said profile to detect any anomalies which could indicate regions of failure. In some embodiments the acoustic profile could be obtained during the excitation due to the perforation charges firing, however an acoustic profile could additionally or alternatively be obtained due to other excitations, such as tools being inserted into or withdrawn from the well bore, and/or a background acoustic profile in response to ambient noise could be obtained and analysed.

The invention also relates to a system for downhole monitoring, said system comprising: a fibre optic interrogator adapted to provide distributed acoustic sensing on an optic fibre arranged along the path of a well bore; a sampler arranged to sample a plurality of channels output from said interrogator to provide acoustic data from a plurality of portions of said fibre at each of a plurality of times; and a data analyser adapted to process said sampled data to detect fracture characteristics and provide indications of said fracture characteristics.

The system of the present invention offers all of the same advantageous and can be implemented with all of the embodiments of the invention as described above.

The invention also provides a processor, computer program and/or a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

DESCRIPTION OF THE DRAWINGS

Preferred features of the present invention will now be described, purely by way of example, with reference to the accompanying drawings, in which.

DESCRIPTION OF THE INVENTION

Figure 1:
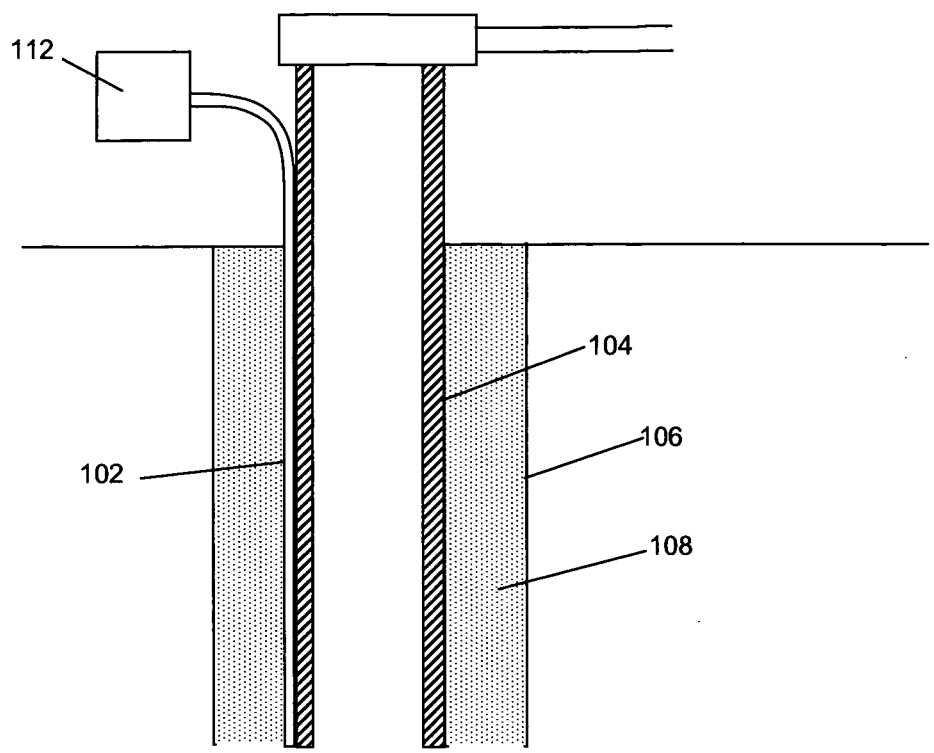
FIG. 1 shows apparatus for monitoring a well using DAS.

A fibre optic cable 102 is included along the path of a well, which in the present example is a gas well, and may be on or offshore. The well is formed at least in part by a metallic production casing 104 inserted into a bore hole 106, with the space between the outer wall of the casing and the hole being back filled with cement 108 in the present example. The production casing may be formed of multiple sections joined together, and in certain instances the sections will have different diameters. In this way the casing diameter is able to narrow gradually towards the bottom of the well. As can be seen in FIG. 1, in this example the fibre passes through the cement back fill, and is in fact clamped to the exterior of the metallic casing. It has been found that an optical fibre which is constrained, for instance in this instance by passing through the cement back fill, exhibits a different acoustic response to certain events to a fibre which is unconstrained. An optical fibre which is constrained may give a better response than one which is unconstrained and thus it may be beneficial to ensure that the fibre in constrained by the cement. The difference in response between and constrained and unconstrained fibre may also be used as an indicator of damage to the cement which can be advantageous will be described later.

The fibre protrudes from the well head and is connected to interrogator/processor unit 112. The interrogator unit injects light into the fibre and senses radiation backscattered from along the length of the fibre. The particular form of the input light and sampling/processing capability of the unit allows simultaneous output of multiple data channels, each channel corresponding to acoustic data sensed along a particular section of the fibre at a particular distance along the fibre. While the interrogator/processor unit is shown here as a single item, hardware may be divided among, for example, an interrogator box providing a raw data output, feeding a PC or portable computer to provide the data processing capability.

Figure 2:
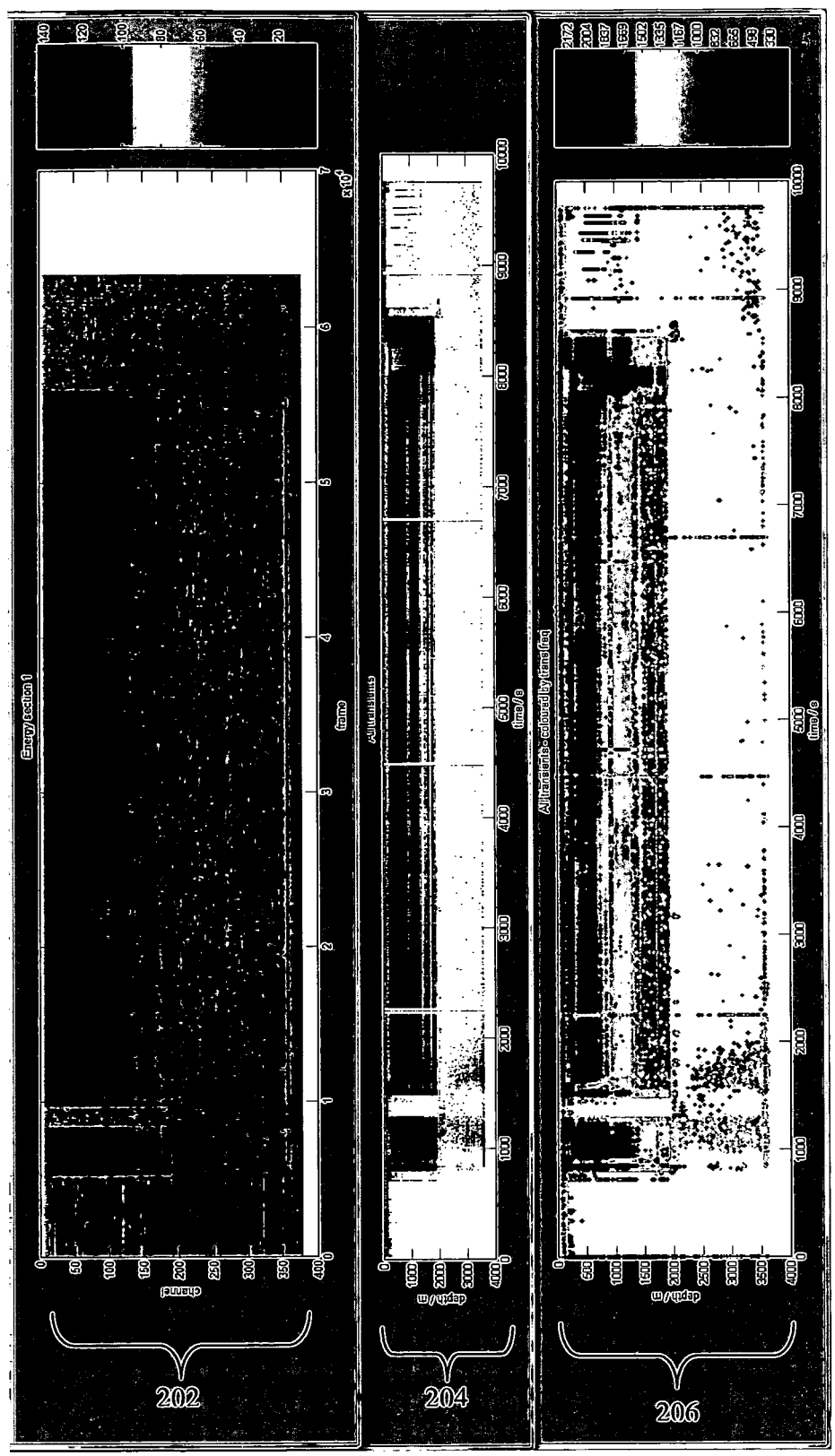
FIG. 2 illustrates the output of the system of FIG. 1.

An example of the type of possible data output from the arrangement of FIG. 1 is shown in FIG. 2. Here channel number (and hence depth for substantially vertical wells) is displayed along the y axis, with zero representing the channel nearest the surface. 400 channels are shown. Time is displayed along the x axis as frame number, to provide a 'waterfall' plot which is continuously refreshed as new data is made available. Detected energy intensity is shown as colour or greyscale in the upper plot 202, using a scale shown on the right hand side to provide a 2D visualisation of the acoustic energy distribution along the entire sensed length of the fibre at each of a series of time instants. The central plot 204 shows the same data after undergoing transient detection, as will be explained in greater detail below, and the lower plot 206 shows the frequency of the detected transients according to the scale to the right of the plot. The arrangement is such that data is available from all channels at every sample period. In the middle 204 and lower plots 206, depth from 0 to 4000 m is represented on the y axis, with time from 0 to 10000 s on the x axis.

It is proposed to use the system described above to monitor various downhole events related to fracturing including perforation, blanking plug and/or packer setting, fracture, proppant wash out and fluid flow. In addition the system may provide general condition monitoring and, in some arrangements, may also allow communication with downhole sensors.

Figure 6A:
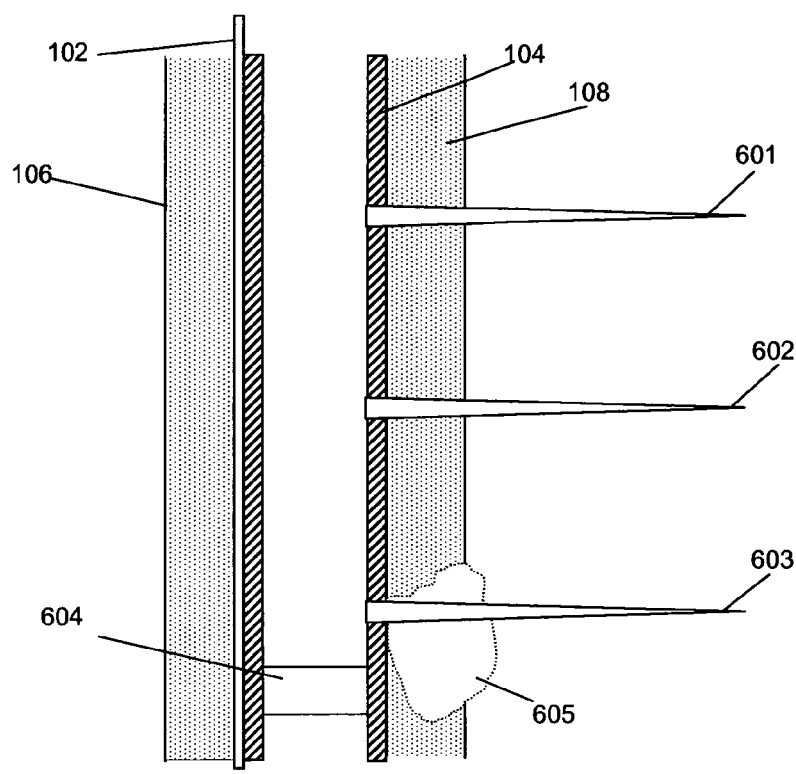
FIGS. 6a and 6b illustrate stages in a hydraulic fracturing process.

In an extraction process for so-called unconventional wells, once the well has been drilled and a casing installed (and one or more fibres provided along the path of the well) the well is perforated to allow ingress of gas, or fluid, such as oil or water, being extracted. This is commonly achieved using shaped charges which are lowed into the well in a 'gun' and fired at a desired depth and orientation. The charge pierces the casing and ruptures the adjacent rock (and any filling material such as cement if present). FIG. 6a illustrates a section of well bore wherein the various components of the well bore are illustrated using the same numbering as described above in relation to FIG. 1. FIG. 6a illustrates that perforation charges at different depths have been fired to create perforations 601, 602 and 603 through the casing 104 and cement 108 into the surrounding rock formation. It will of course be appreciated that the perforation charges may be arranged to fire in different directions into the rock formation, for clarity however all perforations are illustrated in the same general direction. When orientating the perforation charges for firing care should be taken not to fire the perforation charge at the optic fibre 102. This may be achieved by ensuring that the well casing in the vicinity of the fibre and/or the fibre packaging provides a relatively strong magnetic signature and using a magnetic anomaly detector on the perforation charge string to determine and avoid aiming the charges at the relative location of said signature.

After perforation, the perforation charge string is removed and a mixture of fluid, such as water, and a solid proppant, such as sand, is forced down the well at high pressure to fracture the rock along weak stress lines and to create and enlarge permeable paths for gas or other fluid to enter the well.

Once a set of fractures at one level has been created it may be wished to create another set of fractures at another level. A blanking plug is therefore inserted down the well to block the section of well just perforated. The perforating and fracturing process is then repeated at a different level. FIG. 6a illustrates a blanking plug 604 isolating the deeper parts of the well which have been previously fractured.

This process is repeated until all necessary fractures have been completed. At this point production tubing may be inserted down the well bore and packers may be inserted between the production tubing and the casing to close the gap.

Once complete, the well starts production with product entering the casing from adjacent rock formations, and being transported to the surface.

Perforation Monitoring

In one embodiment of the present invention a DAS sensor is used to monitor the perforation event. Monitoring the perforation event can serve at least two distinct purposes. Firstly the location of the perforation can be determined. It can be difficult to control exactly the location and direction of the perforation in a borehole and detecting the location of the perforation can be useful for determining the exact areas of interest for monitoring in a subsequent hydraulic fracturing step. Further, detecting the direction of the perforations is useful in its own right in terms of aiding in control and planning of further perforations. The ability to detect perforation type events will be described later. Also the acoustic signature of the perforation event may be compared to certain expected characteristics to determine whether the perforation occurred satisfactorily.

In addition to monitoring the perforation itself the perforation event is a relatively high energy event which acoustically excites a large proportion of the well bore, i.e. the casing, the cement, any blanking plugs already in place etc. The acoustic response to a perforation event allows an acoustic profile of the well bore to be collected and assessed.

Acoustic data is sampled at between 0.2 Hz and 20 kHz over the length of the drilled hole during a perforation event. The energy present in each channel is monitored by either a bandpass filter and then an rms energy calculation, or by performing an FFT and summing power between an upper and lower frequency band (typically 512 pt FFT, 50% overlapped, filtered between 300 and 5 kHz if sampling rate is practical). A 2D data array of detected energy for time and depth (or position) can be produced.

Figure 3:
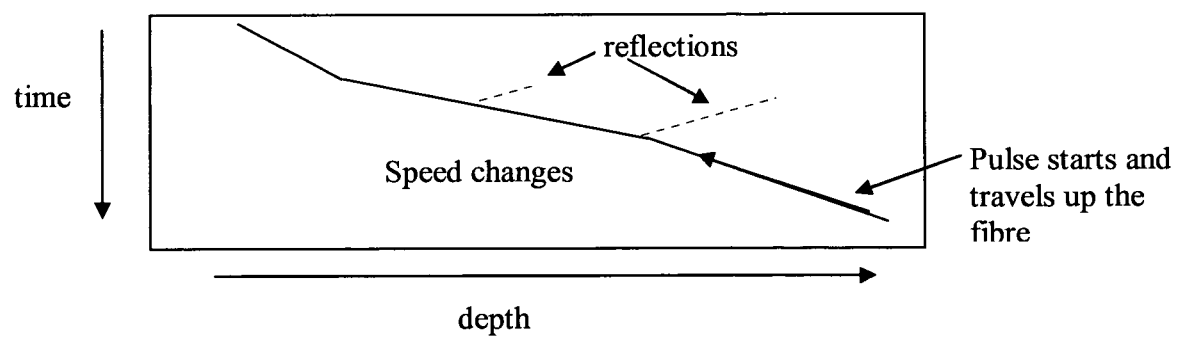
FIG. 3 is a schematic representation of a perforation event as monitored by an embodiment of the present invention.

Further processing of the data array by identifying peaks reveals that the impulsive perforation signal propagates up and down the well casing as well as into the rock. An energy plot as described above can therefore be produced, and a trace can be identified tracking the progress of the pulse as shown in FIG. 3.

The gradient of the identifiable trace can be measured, as it is the rate at which the energy is propagating through the well casing. This gives a measure of the transmission speed in the medium. This can be used to indicate areas of the well casing that are different because their transmission speed changes. This could indicate a problem with the casing attachment, or structural issues in the casing itself.

An automated tracking algorithm could be used to calculate the speed of this energy trace and determine areas where the speed changes.

The proposed algorithm would work on the assumption that the event of interest is much larger than the normal state of the well, so that the peak in energy identified as the perforation event can be reliably identified. Then the peak can be associated over successive time frames, with the average speed over 1, 2, 3, . . . 10 s can be calculated. Further improvements could track multiple peaks at the same time (useful for distinguishing the main pulse in the case of multiple reflections).

Further inspection of FIG. 3 shows clear points of reflection of energy. These arise at joins in the casing and can provide an engineer with information concerning the quality of the joins across the length of the casing. Anywhere there is a significant mismatch in material, a partial reflection may occur, and the larger the mismatch, the greater is the reflection coefficient. Other material failures such as cracks or pitting could significantly affect the propagation of the energy along the casing and fibre, and be identified using this method.

For instance the condition of the cement surrounding the casing may be assessed. The acoustic response of the cement may vary in areas where there is a significant void in the cement, either due to manufacturing as the result of an earlier perforation or fracturing event. Voids in the cement can be problematic because if a subsequent perforation occurs in an area of void when the fluid and proppant is pumped into the well bore it may not flow into the perforations in the rock but into the void—wasting a large amount of proppant and halting well formation whilst the problem is addressed. FIG. 6a illustrates that a void 605 in the cement 108 could be present at a location of one of perforations, in this instance perforation 603. Is such a void is detected, for instance during a perforation step performed for a lower section of the well, the perforation in this area could have been avoided and/or the void filled prior to perforation.

As mentioned above the response of an unconstrained fibre is different to that of a constrained fibre and thus if the fibre does itself pass through a void in the cement, and thus is unconstrained in that area, the acoustic response will be very different. Thus the present invention may include detecting voids in the cement surrounding the casing.

The positioning and condition of blanking plugs 604 can also be assessed in this way. If the blanking plug 604 is not set in the correct position or is defective and has failed or is likely to fail, then during the hydraulic fracturing process fluid may be forced into an undesired part of the well resulting in loss of proppant and time and potentially impacting on previous successful fractures. By determining in advance that a blanking plug is not correctly set a new plug can be inserted where required before the hydraulic fracturing process is started.

Fracture Fluid and Proppant Monitoring

Figure 6B:
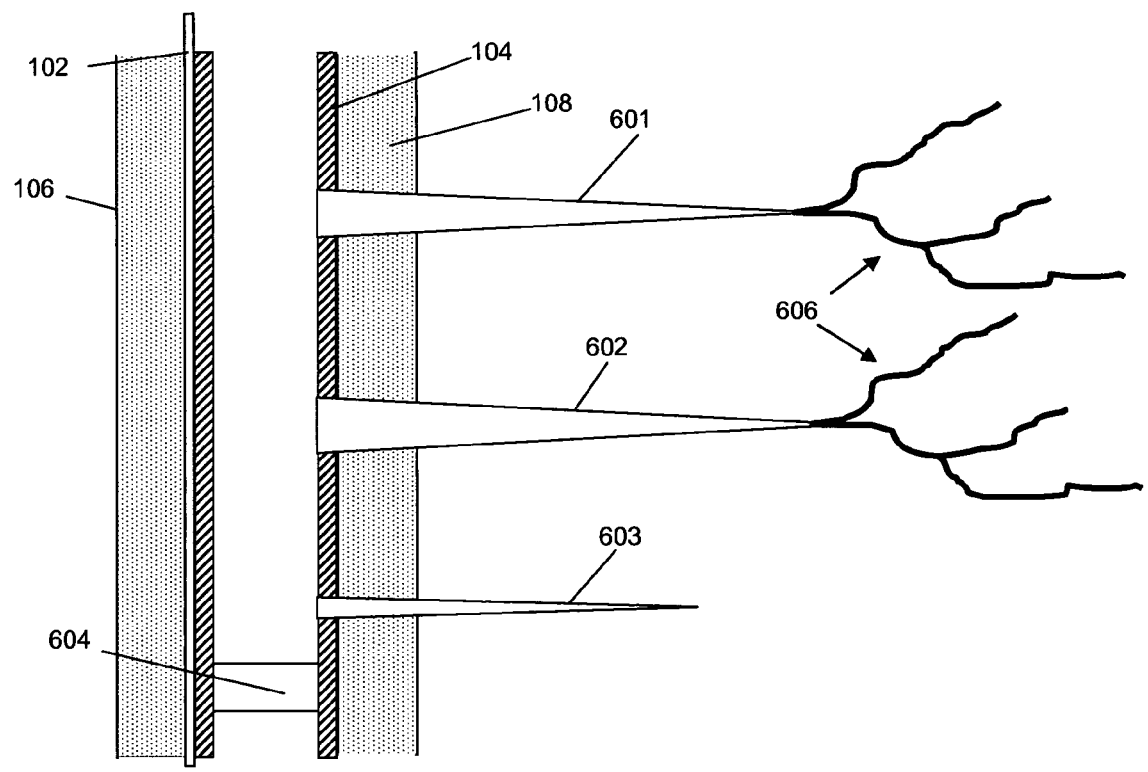

Once the perforations have been made the fluid and proppant is flowed into the well to cause fracturing 606, as illustrated in FIG. 6b. The acoustic responses of the acoustic channels of fibre in the vicinity of the perforations are monitored. Flow of the high pressure fluid containing a solid particulate through the casing 104 creates lots of acoustic disturbance and all channels of the fibre that correspond to sections of the well bore in which flow is occurring will generate show an acoustic response. However it has been found that the acoustic channels in the vicinity of the perforation sites exhibit an acoustic response which is related to the flow of fracture fluid into the perforation site and the fracturing occurring. It has also been found that this response can be seen most markedly by looking at discrete frequency bands of the acoustic disturbances.

Figure 7A:
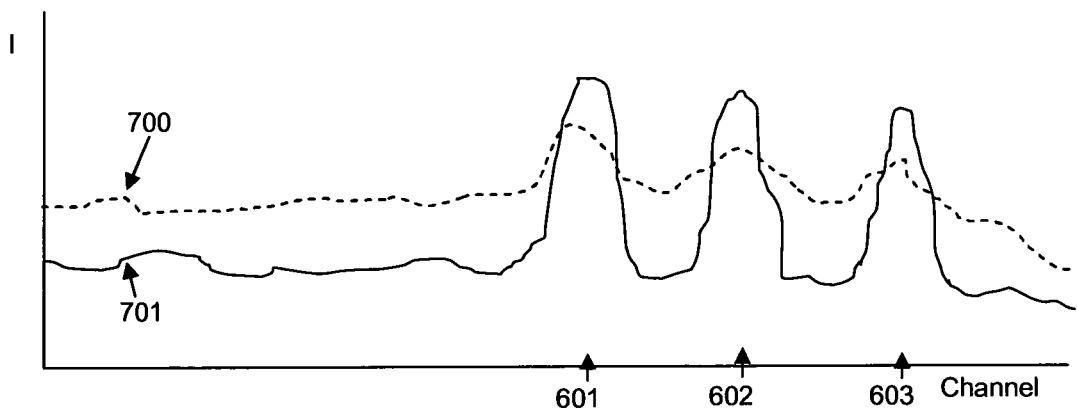
FIGS. 7a and 7b illustrate signal returns that may be obtained during a hydraulic fracturing process.

FIG. 7a illustrates the acoustic intensity that may be detected by a plurality of acoustic channels of the fibre in the vicinity of the perforation sites illustrated in FIG. 6a (assuming that void 605 is not present) during the hydraulic fracturing process. Arrows 601, 602, and 603 illustrate the location of the perforation sites. Dashed curve 700 illustrates a normalised average intensity of all acoustic disturbances detected by the fibre. It can be seen that there is a general level of disturbance of acoustic sections of the fibre throughout the section shown, although the intensity drops for channels which represent sections of the well bore below blanking plug

604. In the vicinity of the perforation sites 601, 602 and 603 there are slight increases in acoustic intensity. Solid curve 701 however shows the normalised acoustic intensity for disturbances within a spectral band, i.e. disturbances that have a frequency within a particular range. It can be seen that the intensity difference in signal in the vicinity of the perforation sites is much more pronounced. The exact frequency band of interest may vary depending on the parameters of the well bore, the casing, the surrounding rock formation and the flow parameters of the fracture fluid, i.e. pressure, flow rate, proppant type and proportion etc. The signal returns may therefore be processed in a number of different frequency bands and displayed to an operator, either simultaneously (e.g. in different graphs or overlaid curves of different colours) or sequentially or as selected by the user. The data may also be processed to automatically detect the spectral band that provided the greatest difference between the intensity at channels in the vicinity of the perforation site and channels at other sections of the well.

Curve 701 illustrates that the acoustic response at each of the perforation sites is approximately the same. This can indicate that fracture fluid is being forced into all of the perforation sites equally and they all have similar characteristics.

In some instances however some fracture sites may be active than other sites. FIG. 6b represents the situation which may have developed that perforation sites 601 and 602 have been enlarged by the fracture fluid being forced into them and that the rock formation is being fractured at fracture points 606. However no significant fracturing is occurring at perforation site 603. This may occur for a variety of reasons but once such a situation develops, most of the fracture fluid may flow into perforation sites 601 and 602, with the result that site 603 remains dormant. If this situation continues then eventually, when the fracturing process is complete, only perforation sites 601 and 602 will provide significant paths for oil or gas to flow to the well bore and thus this section of well will be less efficient than intended.

Figure 7B:
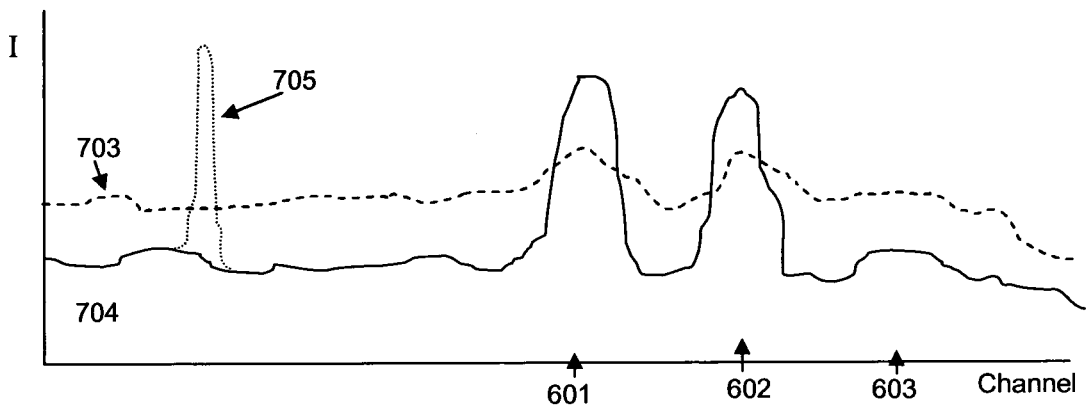

To remedy such a situation the fracture sites 601 and 602 may be partially blocked by adding solid material to the fracture fluid to cause a blockage. However determining whether all fracture sites are fracturing in the same way has not previously been possible in any reliable way. The present invention however provides a reliable real-time mechanism for monitoring flow of fracture fluid and determining whether all fractures are proceeding equally. FIG. 7b illustrates the acoustic response that may be generated from the situation shown in FIG. 6b. Dashed curve 703 shows the total intensity, i.e. acoustic energy, for each channel across all frequencies. Again this curve does show the general trend but it is much clearer looking at solid curve 704 which again shows the acoustic response from a narrowed spectral range. Curve 704 shows that whilst there is a large signal intensity at perforation sites 601 and 602 due to the fracture fluid flowing into the perforation site and causing fracturing, there is in this instance, no such response in the vicinity of perforation site 703. This indicates that the extent of any fracturing via perforation site 603 is significantly limited.

By displaying such a graphical representation to an operator in real time the operator receives information that allows him the see how the fracture process is progressing and if there are any problems with the fracture process. The value of intensity and/or frequency of the acoustic signal corresponding to fracture fluid flowing into a perforation site and causing fracturing may also be analysed to determine some parameters about the fractures, such as general size of the fractures and/or rate of fracturing.

In addition to providing a visible display, for instance in a control room or the like, a particular acoustic channel may be selected for audible playback. In other words the operator can get to listen to the signals detected by a particular section of fibre. In essence the relevant section of fibre acts as a microphone. The ability to listen, in real time, to signals at a section of well deep underground during hydraulic fracturing is believed to be novel. By listening to the signals detected the operator can get a feel for the fracturing process and how is it progressing. By swapping between the channels associated with the various fracture sites the operator can determine himself whether there are any significant differences in fracturing at the various perforation sites and/or whether changes to the flow parameters have had any significant effect.

As mentioned above in some instance the fracture fluid may not flow into the rock and proppant wash-out may occur. The flow of proppant fluid in normal operation will generally proceed at a certain rate and with a certain characteristic. If the fluid finds another path or ceases to fracture correctly the flow conditions within the well may change. The acoustic response during proppant fluid flow may therefore be monitored to detect any significant change. If a different part of the casing fails this may be apparent by the sudden appearance of a signal, such as signal component 705 at a different part of the well bore. Detection of such a component may be used to generate an alarm.

Seismic Fracture Monitoring

Figure 4:
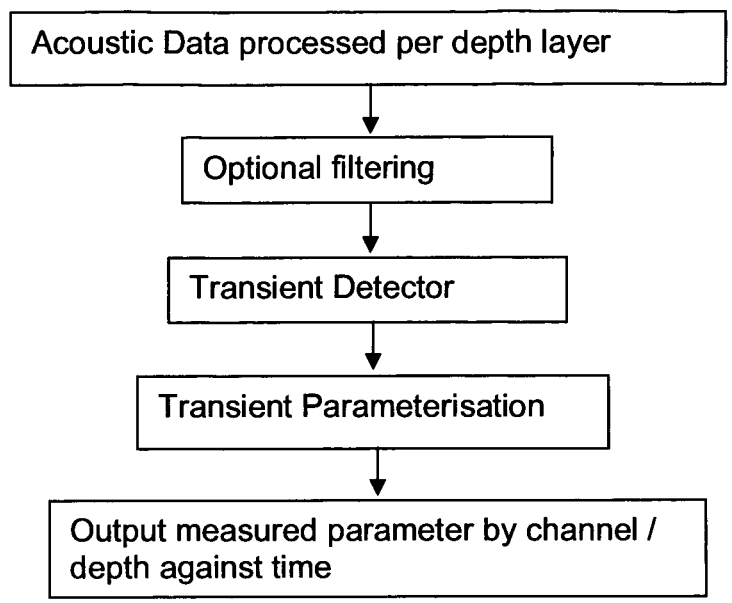
FIG. 4 illustrates seismic detection and parameterisation steps for fracture monitoring.

Seismic and fracture events caused by actual fracturing of the rock are of a distinctly different nature from the continuous flow noise caused by the high pressure influx of water and sand during the fracturing process. Generally they are characterised by being short and impulsive events—hereafter referred to as transient events. A technique looking at short term variations away from the mean variable levels (the transient detector) will extract these events from background and long period noise. The general processing method is set out in FIG. 4.

By processing the acoustic data received to highlight transient events in this way, a fracture event can be detected and observed, and various parameters can be determined.

The rate at which fractures are occurring, or fracture density, can be determined according to the number and/or intensity of detected fractures over a defined period or depth range.

The depth, for a vertical well section, at which fracture is occurring, can be determined according to the channel or channels at which fracture events are detected. Similarly for a horizontal section of well the fracture can be located to a particular horizontal section. If the fracture event is detected by multiple channels the channel which receives the signal first may be taken to the closest to the fracture event and thus used to identify the relevant section of well, e.g. depth for a vertical well section. Further the time of arrival at multiple channels may be used to provide an estimate of the range to the fracture. By estimating the speed of propagation of the seismic signals the relative path differences from the sensing section of the fibre to the source can be calculated and, provided the same transient is detected at enough different sensing sections of fibre, the range to the source of the transient can be determined.

A measure of fracture magnitude can be determined. The intensity of the transient may be indicative of the magnitude of the fracture, although signals from more distant fractures will be attenuated more by travel through the ground than those from nearby fractures and so the intensity may need to be weighted according to the distance of the fracture. The frequency content of the transient may also be indicative of the magnitude of the fracture. Fractures of greater magnitude may generate transients of greater frequency. The measured duration of a fracture, i.e. the duration of the transient or a series of related transients can indicate a high magnitude fracturing event. Also the number of channels of the fibre that receive a transient or series of transients from a single event may indicate the extent or span of the fracture.

To provide a single parameter for frequency, the mean frequency of the spectral shape of the event can be used. Other frequency parameters which can be determined include second order statistics such as skew and kurtosis.

An indication of the type of fracturing event may be determined. For instance a fracture event that fractures rock strata in a relatively clean shear may generate a transient having a particular frequency characteristic, for instance the energy may be concentrated in one or more narrow frequency bands. A fracture that is more like a shattering event breaking the rock into multiple sections may produce a transient with a greater frequency spread. Further the evolution of the signal intensity in the transient or series of transients may indicate the type of fracture.

The characteristics of the transient may be compared to one or more known characteristics of known types of fractures, for instance obtained from historical fracturing information. For instance the transient characteristics may be compared to those detected in similar rock formations during the fracturing process for wells that have proved to be efficient production wells.

An estimate of range from the well can be made based on the frequency characteristics of a fracture event as different frequency components of the signal experience different levels of attenuation.

In order to identify transients among other background data a measure of short term variability is compared with the normal or an average variability for a given channel.

In one embodiment this is achieved by populating statistics representing the mean energy and the mean absolute deviation about the mean (MAD: mean of absolute difference of current value and mean value).

These two statistics are updated by exponential averaging as each data update is received, using a decay term, N.

Mean data=((N−1)/N)*mean data+(1/N)*new Data

MAD=((N−1)/N)*MAD data+(1/N)*abs(new Data−mean data)

Where the data first undergoes an FFT and where calculations are performed per channel and per frequency cell.

The transient level is then defined as:

Abs|new data−mean data|/MAD

This gives a value relating to how much a particular frequency cell is higher in variability than its average variability. Hence very variable channels are self regulating and it is only excessive and unusual variability that is detected. By varying the values of N the algorithm can be tuned to detect different length transient events. Typically factors of 4, 6, 8, . . . 128 are used but these depend on the length of the transient required and the FFT rate of the system. By performing this process in the frequency domain, a high degree of control is achieved over the frequencies used to form a transient event, and knowledge of the transient spectral structure is calculated and preserved for feature extraction.

The algorithm adaptively selects an exponential factor according to whether a transient is triggered. When recalculating the mean and medium values, if a frequency cell is above threshold as a detection it will use a different value for N (in this example 100N is used) meaning that the transient event is included in the general statistics at a much reduced rate compared with the normal events.

The location of fracture events may also be monitored to allow fracture mapping or fracture density mapping. In a typical production environment there may be several wells in the same oil or gas field. Ideally each well taps a different part of the field. However, it is possible for the fractures created in one well to run into the same area as the fractures from another well. In this instance the new well may not increase production as any production at the new well decrease production at the old well. It is therefore desirable to monitor the location of fractures. The use of a DAS system offers the ability to detect and monitor where the fracture event are occurring in real time, thus allow control over the fracturing process.

It has surprisingly been found that DAS systems may be used to separately detect P and S waves. P waves (pressure or primary waves) are longitudinal waves which propagate through solid material. S waves are shear waves or secondary waves which are transverse waves. Co-pending patent application PCT/GB2009/002055, the contents of which are hereby incorporated by reference thereto, describes how a DAS system can be used to detect P and S waves and discriminate between them. Detecting the S waves of the fracture event may allow the location to be determined. To determine the location of the fracture event multiple fibres and/or time of arrival type techniques may be used as described in co-pending application no. GB0919904.3 the contents of which is hereby incorporated by reference thereto.

Further it will be noted that the S wave, being a transverse wave, will have a shear direction associated with the wave. Detection of the different components of the S wave will allow a determination of the orientation of the fracture. This is particularly useful as fractures in the horizontal plane are not preferred as the injected sand is generally insufficient to keep the fracture open given the weight of rock above. A vertical fracture is thus preferred. To detect the orientation of the S wave the incoming wave may be resolved into components in three dimensions. By arranging one or more sensing fibres in three dimensions the components of the incident wave may be resolved. The use of one or more fibre optics which preferentially respond to acoustic disturbances in one direction (i.e. it bends more easily in one transverse direction than in the orthogonal transverse direction) may help resolve an incident acoustic wave into its components, as described in co-pending application GB0919902.7, the contents of which are hereby incorporated by reference thereto.

Figure 8:
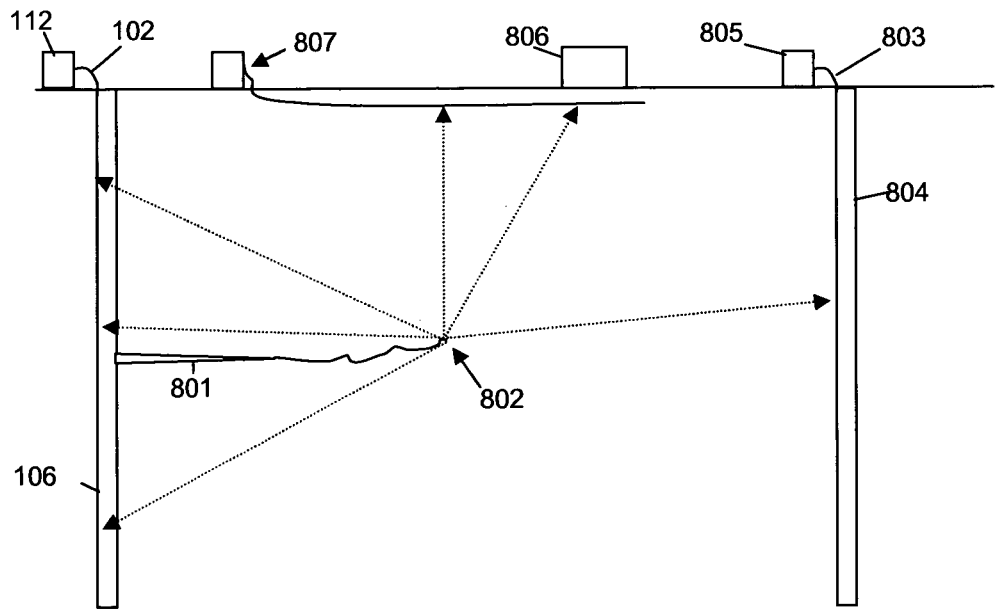
FIG. 8 illustrates the principle of detecting fracture events at multiple locations.

FIG. 8 illustrates a well bore 106 having an optic fibre 102 arranged down the hole and an interrogator 112 to provide a DAS sensor as describe above. A hydraulic fracturing process is being performed perforation/fracture site 801. A particular fracture event occurs at location 802. This fracture event will create a transient seismic signal which will propagate to various channels of fibre 102. The time of arrival at different channels may be used to determine the depth of the fracture event. In additional however another DAS sensor is provided by another optic fibre 803 arranged down a different bore hole 804 and connected to another interrogator 805. This additional DAS sensor may be deployed in an existing well and/or a DAS sensor may be provided in a bore hole provided purely for observational purposes. The signals from the fracture event will also be received by the sensing portions of fibre 803 and thus will be detected. The signals from both DAS sensor may be sent to a central processor 806, which may for instance be located in a control room, which analyses the data to detect the same transient signal being detected by the various sensing portions of the sensors. Multi-lateration techniques may then be applied to determine the origin of the acoustic disturbance and hence the location of the fracture event. Provided that there are enough sensors to resolve any positional ambiguity the location of various fracture events can be recorded and hence a three dimensional fracture map of the fractures produced during hydraulic fracturing can generated. As shown in FIG. 8 the DAS sensor do not all have to be deployed down bore holes and at least one sensor 807 may be located at surface level or buried slightly below the surface.

Inflow Monitoring

Whilst the present invention has been described in relation to detection of fracturing event it will be clear that the optical fibre, when deployed, will remain in the well during operation. The DAS sensing can also provide useful sensing capabilities relating to the subsequent operation of the well. For instance the monitoring of fluid such as oil and gas flowing into a well from neighbouring rock formations typically requires much greater sensitivity than any of the previous techniques as it looks for the characteristic sound of oil or gas as it enters the casing pipe, a relatively quiet and subtle noise source. Detecting and quantifying the areas of inflow within a well is possible by analysing a 3D data set of detected activity by distance/depth over a time period, as can be shown using a 2D 'waterfall' energy map.

Figure 5:
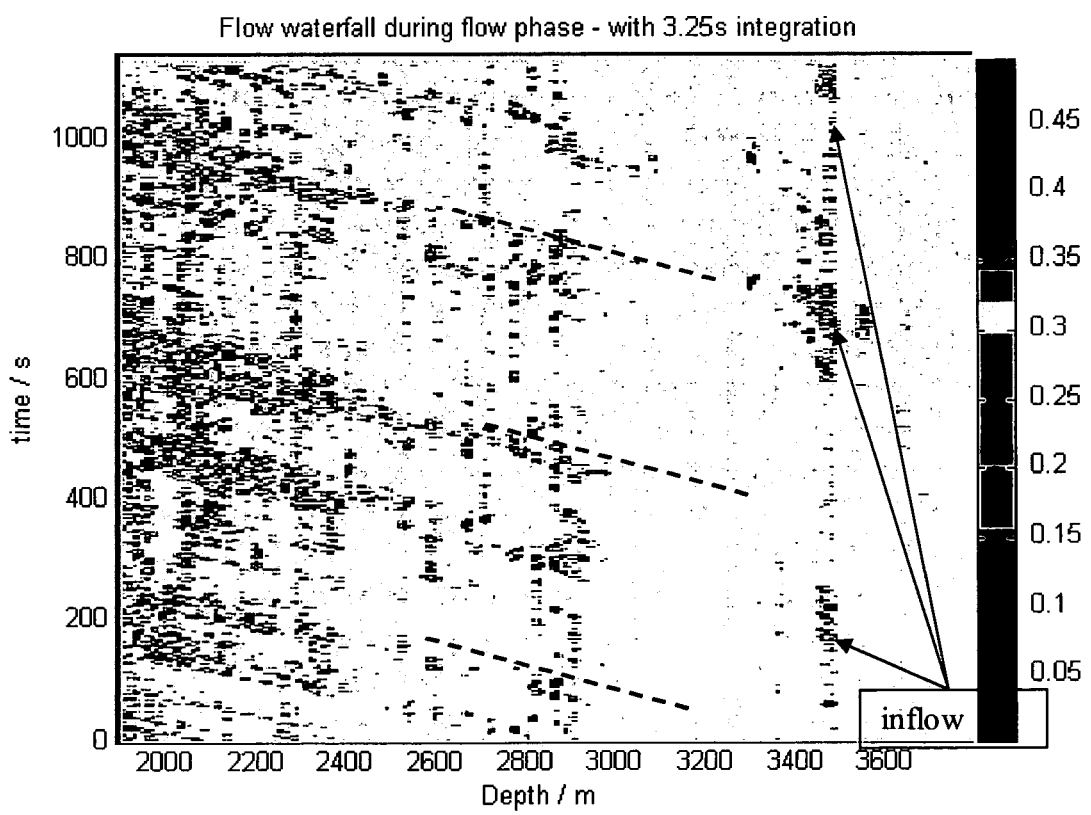
FIG. 5 shows the results of inflow monitoring having been enhanced using variance statistics.

The effects of interest are very subtle and typically manifest themselves as variations within the noise structure rather than easily discernible features above the noise as seen in perforation detection. Reliability and accuracy of detection can be improved by emphasising areas where the energy varies in a characteristic way. The variance statistics rather than the direct energy of each channel were examined over short periods of time and used to provide indications of inflow. As can be seen in FIG. 5 this technique shows more clearly the area of inflow (marked by an arrow) and the diagonal structures (emphasised with dashed line) caused by energy or material moving up the pipe.

Multiple methods of monitoring and parameterisation have been described above, and the different characteristics of the signals being and analysed (frequency content, amplitude, and signal to noise) place a wide range of demands on the sensing apparatus. Due to the large dynamic range and the relatively high sampling rates of the DAS monitoring system however, all of the above monitoring and processing can be performed using the same system as shown schematically in FIG. 1.

In addition, and as mentioned above, the configuration of the channels can also be adjusted, and different channel settings can be used for different monitoring operations. The channel settings can also be adaptively controlled in response to monitored data, for example if a significant fracture density occurs at a certain depth, it may be desirable to monitor that particular depth with greater resolution for a period of time, before reverting to the original channel configuration.

In this way a complete monitoring program can be run by a single system over a whole sequence of well operations from perforation to fluid inflow. The system can be arranged to transition from one type of detection to another in response to detected events, and can adaptively vary both sensing and data processing parameters for a given monitoring/detection activity.

In addition the DAS system may be used as a means of communicating with down-hole sensors. US2009/0003133 describes a method of transmitting data from down well sensors and the like using acoustic using the casing itself as an acoustic medium. Instead the acoustic fibre may be used to receive encoded acoustic signals which mean that lower power signals could be transmitted and done so reliably. Co-pending application GB2010/000602 describes an acoustic transducer suitable for use in this environment.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A method of downhole monitoring of hydraulic fracturing comprising the steps of:
    interrogating an optic fibre arranged down the path of a well bore to provide a distributed acoustic sensor,
    sampling data from a plurality of longitudinal portions of the fibre; and
    processing said data to provide an indication of at least one fracturing characteristic wherein the indication of at least one fracturing characteristic comprises an indication of at least of: (a) intensity levels; (b) frequencies; and (c) spread of frequencies of acoustic disturbances in at least one longitudinal sensing portion of the fibre in a vicinity of the fracture site, and wherein said indication(s) are used to provide an indication of the flow of proppant and fluid into a fracture.

2. A method as claimed in claim 1 wherein the method provides a real-time indication of said at least one fracturing characteristic.

3. A method as claimed in claim 1 wherein said optic fibre is arranged in the well bore in which hydraulic fracturing is performed.

4. A method as claimed in claim 1 wherein the indication of at least one fracturing characteristic comprises an audible signal representing the acoustic signals detected by at least one longitudinal portion of fibre in the vicinity of a fracturing site.

5. A method as claimed in claim 1 wherein the indication of the intensity levels is used to control flow conditions of proppant and fluid into the wellbore.

6. A method as claimed in claim 1 wherein the indication of at least one fracturing characteristic comprises a comparison of the intensity levels of acoustic disturbances from at least one longitudinal sensing portion of the fibre in the vicinity of each of a plurality of different fracture sites.

7. A method as claimed in claim 6 wherein the indication of at least one fracturing characteristic comprises a display of acoustic energy for each of the separate longitudinal sensing portions being monitored.

8. A method as claimed in claim 6, wherein said indication(s) are used to indicate the relative flow of proppant and fluid into each of the plurality of different fracture sites.

9. A method as claimed in claim 1 wherein the measured acoustic disturbances from at least one longitudinal sensing portion in the vicinity of a fracturing site are divided into one or more spectral bands and an average intensity determined for each of said spectral bands.

10. A method as claimed in claim 9 wherein the indication of at least one fracture characteristic comprises a display, for at least one longitudinal sensing portion of the fibre for each fracturing site, of the acoustic intensity from a selected spectral band.

11. A method as claimed in claim 9 comprising the step of analysing data from a plurality of spectral bands to identify a spectral band of interest.

12. A method as claimed in claim 11 wherein said analysing step comprises determining a spectral band in which the intensity of acoustic disturbances in that spectral band in the longitudinal sensing portions of fibre corresponding to the fracture sites are significantly higher than the intensity in other nearby longitudinal sensing portions.

13. A method as claimed in claim 11 wherein said analysing step comprises detecting any spectral band in which the intensity at one or more longitudinal sensing portions corresponding to a fracture site is significantly lower than the intensity at longitudinal sensing portions corresponding to one or more other fracture sites.

14. A method as claimed in claim 11 wherein said indication of at least one fracture characteristic comprises a display of the intensity of acoustic disturbances from at least one longitudinal sensing portion in the vicinity of the fracture site in said spectral band of interest.

15. A method as claimed in claim 11 wherein said spectral band of interest comprises an indication of a fracture characteristic.

16. A method as claimed in claim 1 comprising the step of monitoring evolution of intensities of the longitudinal sensing portions of the fibre corresponding to the fracture sites during the fracturing process.

17. A method as claimed in claim 16 comprising the step of determining any significant change in an average intensity in any relevant longitudinal sensing portion changes and/or the relative intensities in the longitudinal sensing portions of the fibre corresponding to the fracture sites.

18. A method as claimed in claim 1 wherein the steps of interrogating the fibre and sampling data comprises launching a series of optical pulses into said fibre and detecting radiation Rayleigh backscattered by the fibre; and processing the detected Rayleigh backscattered radiation to provide a plurality of discrete longitudinal sensing portions of the fibre.

19. A method as claimed in claim 1 wherein said fibre is single mode fibre which is, absent any external stimulus, free of any substantial change of optical properties along the fibre length.

20. A method as claimed in claim 1 where the longitudinal sensing portions of fibre are 10 m or less in length.

21. A method according to claim 1 wherein fibre is sampled at a sampling rate is greater than or equal to 5 kHz.

22. A method according to claim 1, wherein at least 250 channels are sampled simultaneously.

23. A computer program product which, when run on a suitably programmed computer connected to or embodied within a controller for an optical interrogator or a downhole fibre optic, performs the method of claim 1.

24. A method as claimed in claim 1 wherein the indication of at least one fracture characteristic comprises an indication of proppant wash-out.

25. A method of downhole monitoring of hydraulic fracturing comprising the steps of:
  interrogating an optic fibre arranged down the path of a well bore to provide a distributed acoustic sensor;
  sampling data from a plurality of longitudinal portions of the fibre; and
  processing said data to provide an indication of at least one fracturing characteristic, wherein the indication of at least one fracturing characteristic comprises an indication of proppant wash-out.

26. A method as claimed in claim 25 wherein the method comprises analysing data from sensing portions of the fibre along a length of the well bore during hydraulic fracturing to detect any signals indicative flow of fluid out of a well casing which do not correspond to a fracturing site.

27. A method as claimed in claim 25 further comprising the step of identifying any potential points of failure of the casing and/or surrounding cement prior to hydraulic fracturing.

28. A method as claimed in claim 27 comprising the step of monitoring an acoustic disturbance from a plurality of sensing portions of the fibre to generate an acoustic profile of the well bore and analysing said profile to detect any anomalies.

29. A method as claimed in claim 28 wherein said acoustic profile is acquired by monitoring the acoustic disturbances in response to a perforation charge being fired.

30. A method as claimed in claim 25 wherein the method provides a real-time indication of said at least one fracturing characteristic.

31. A method as claimed in claim 25 wherein said optic fibre is arranged in the well bore in which hydraulic fracturing is performed.

32. A method as claimed in claim 25 wherein the indication of at least one fracturing characteristic comprises an audible signal representing the acoustic signals detected by at least one longitudinal portion of fibre in the vicinity of a fracturing site.

33. A method as claimed in claim 25 comprising the step of monitoring evolution of intensities of the longitudinal sensing portions of the fibre corresponding to the fracture sites during the fracturing process.

34. A computer program product which, when run on a suitably programmed computer connected to or embodied within a controller for an optical interrogator or a downhole fibre optic, performs the method of claim 25.

35. A method of downhole monitoring of hydraulic fracturing comprising the steps of:
  interrogating an optic fibre arranged down the path of a well bore to provide distributed acoustic sensing;
  sampling data from a plurality of longitudinal portions of the fibre; and
  processing said data to provide an indication of at least one fracturing characteristic comprising the step of performing transient detection to determine at least one of a direction to, a range to or a location of the origin of the transient.

36. A method as claimed claim 35 where the indication of at least one fracture characteristic comprises an indication of a number and/or rate of transients in the acoustic signal.

37. A method as claimed in claim 36 wherein the indication comprises a comparison of the number and/or rate of transients to an expected number/rate.

38. A method as claimed in claim 35 where the indication of at least one fracture characteristic comprises an indication of an intensity of transients in the acoustic signal.

39. A method as claimed in claim 35 where the indication of at least one fracture characteristic comprises an indication of a duration of transients or a series of transient in the acoustic signal.

40. A method as claimed in claim 35 where the indication of at least one fracture characteristic comprises an indication of a frequency of transients in the acoustic signal.

41. A method as claimed in claim 40 comprising analysing a frequency spread of detected transients.

42. A method as claimed in claim 35 comprising analysing an evolution of the transient signal or a series of transient signals.

43. A method according to claim 35, wherein transient detection includes maintaining a measure of mean absolute deviation.

44. A method according to claim 43, wherein said measure of mean absolute deviation is updated by exponential averaging using a decay term, N.

45. A method according to claim 44 wherein said decay term N is adaptively varied.

46. A method according to claim 35 comprising using a time-of-arrival technique to determine at least one of a direction to, a range to or a location of the origin of the transient.

47. A method as claimed in claim 46 further comprising the step of analysing data from at least one other sensor at another location.

48. A method as claimed in claim 47 wherein said at least one additional sensor comprises at least one other fibre optic distributed acoustic sensor.

49. A method as claimed in claim 35 wherein said indication of at least one fracture characteristic comprises a fracture map.

50. A method as claimed in claim 35 wherein the method provides a real-time indication of said at least one fracturing characteristic.

51. A method as claimed in claim 35 wherein said optic fibre is arranged in the well bore in which hydraulic fracturing is performed.

52. A method as claimed in claim 35 wherein the indication of at least one fracturing characteristic comprises an audible signal representing the acoustic signals detected by at least one longitudinal portion of fibre in the vicinity of a fracturing site.

53. A method as claimed in claim 35 comprising the step of monitoring evolution of intensities of the longitudinal sensing portions of the fibre corresponding to the fracture sites during the fracturing process.

54. A computer program product which, when run on a suitably programmed computer connected to or embodied within a controller for an optical interrogator or a downhole fibre optic, performs the method of claim 35.

55. A method of hydraulic fracturing of a well bore comprising the steps of:
flowing a fracture fluid down the well bore under pressure,
performing the method of monitoring as claimed in any preceding claim; and
adjusting flow parameters of the fracture fluid in response to said indication of at least one fracturing characteristic.

56. A method of hydraulic fracturing as claimed in claim 55 wherein the step of adjusting the flow parameters comprises at least one of: stopping the flow, adjusting the flow rate and adding additional solid material to the fracture fluid.

57. A method as claimed in claim 55 wherein the method comprises determining characteristics of transients in the detected acoustic signals and adjusting the flow parameters to achieve a desired transient characteristic.

58. A method as claimed in claim 55 wherein the method comprises automatically adjusting flow parameters based on the fracturing characteristic.

59. A system for downhole monitoring, said system comprising: a fibre optic interrogator adapted to provide distributed acoustic sensing on an optic fibre arranged along the path of a well bore; a sampler arranged to sample a plurality of channels output from said interrogator to provide acoustic data from a plurality of portions of said fibre at each of a plurality of times; and a data analyser adapted to process said sampled data to detect fracture characteristics and provide indications of said fracture characteristics wherein the indication of at least one fracturing characteristic comprises an indication of at least one of: (a) the intensity levels; (b) the frequencies, and (c) the spread of the frequencies of acoustic disturbances in at least one longitudinal sensing portion of the fibre in the vicinity of a fracture site, and wherein said indication(s) are used to provide an indication of the flow of proppant and fluid into a fracture.

60. A system as claimed in claim 59 wherein the optic fibre is deployed along an exterior of the well casing.

61. Use of a distributed acoustic sensor system according to claim 59 downhole in a well bore in which hydraulic fracturing is being performed to provide information about the fracturing process for controlling the hydraulic fracturing process.

62. A system for downhole monitoring, said system comprising: a fibre optic interrogator adapted to provide distributed acoustic sensing on an optic fibre arranged along the path of a well bore; a sampler arranged to sample a plurality of channels output from said interrogator to provide acoustic data from a plurality of portions of said fibre at each of a plurality of times; and a data analyser adapted to process said sampled data to detect fracture characteristics and provide indications of said fracture characteristics, wherein the indication of at least one fracture characteristic comprises an indication of proppant wash-out.

63. Use of a distributed acoustic sensor system according to claim 62 downhole in a well bore in which hydraulic fracturing is being performed to provide information about the fracturing process for controlling the hydraulic fracturing process.

64. A system for downhole monitoring, said system comprising: a fibre optic interrogator adapted to provide distributed acoustic sensing on an optic fibre arranged along the path of a well bore; a sampler arranged to sample a plurality of channels output from said interrogator to provide acoustic data from a plurality of portions of said fibre at each of a plurality of times; and a data analyser adapted to process said sampled data to detect fracture characteristics, provide indications of said fracture characteristics, to perform a transient detection, and to determine at least one of a direction to, a range to, or a location of the origin of the transient.

65. Use of a distributed acoustic sensor system according to claim 64 downhole in a well bore in which hydraulic fracturing is being performed to provide information about the fracturing process for controlling the hydraulic fracturing process.

* * * * *